United States Patent [19]
Spokoyny et al.

[11] Patent Number: 5,538,539
[45] Date of Patent: Jul. 23, 1996

[54] CATALYTIC SULFUR TRIOXIDE FLUE GAS CONDITIONING

[75] Inventors: Felix E. Spokoyny, Costa Mesa; Vincent F. Middleton, San Juan Capostrano, both of Calif.

[73] Assignee: Wahlco, Inc., Santa Ana, Calif.

[21] Appl. No.: 376,244

[22] Filed: Jan. 20, 1995

[51] Int. Cl.$^6$ .................................................. B03C 3/013
[52] U.S. Cl. .................................. 96/52; 55/292; 96/57; 96/60; 110/345; 422/177
[58] Field of Search ............................... 95/58, 68, 78; 422/177; 96/52, 60, 61, 64, 73, 57; 423/244.02; 55/292, 293, 302; 110/345

[56] References Cited

U.S. PATENT DOCUMENTS

| | | | |
|---|---|---|---|
| 2,841,242 | 7/1958 | Hall | 95/58 |
| 3,568,404 | 3/1971 | Walker | 95/58 |
| 3,581,463 | 6/1971 | Roberts | 95/58 |
| 3,686,825 | 8/1972 | Busby | 95/58 |
| 3,993,429 | 11/1976 | Archer | 431/5 |
| 4,070,424 | 1/1978 | Olson et al. | 96/52 X |
| 4,987,839 | 1/1991 | Krigmont et al. | 95/58 X |
| 5,011,516 | 4/1991 | Altman et al. | 95/58 |
| 5,122,162 | 6/1992 | Krigmont et al. | 95/58 X |
| 5,300,270 | 4/1994 | Krigmont et al. | 95/58 X |
| 5,320,052 | 6/1994 | Spokoyny et al. | 110/345 |

FOREIGN PATENT DOCUMENTS

| | | | |
|---|---|---|---|
| 3530415 | 2/1987 | Germany | 95/58 |

*Primary Examiner*—Richard L. Chiesa
*Attorney, Agent, or Firm*—Howard E. Sandler

[57] ABSTRACT

An apparatus for the selective control of the sulfur trioxide concentration in flue gases, to enhance the ash removal efficiency of electrostatic precipitators, which includes: catalytically converting a portion of the sulfur dioxide contained within the flue gas to sulfur trioxide, by passing a portion of such flue gas through at least one catalyst containing converter module which is positioned within such a flue gas stream; and selectively varying the quantity of flue gas passing through such module by providing an aspirating force to cause flue gas to be drawn through such a converter module.

37 Claims, 4 Drawing Sheets

CATALYTIC SULFUR TRIOXIDE FLUE GAS CONDITIONING

BACKGROUND OF THE INVENTION

This invention relates to power plant operations, and, more particularly, to an approach for treating a flue gas stream produced in a fossil fuel power plant, especially a coal-fired power plant, to assist an electrostatic precipitator in the efficient removal of particulate matter from the flue gas stream.

In a fossil fuel power plant, a fuel is burned in air to produce a flue gas. The flue gas heats water in a boiler to generate steam, which turns a turbine to produce power. After passing through various apparatus, the flue gas is exhausted through a stack to the atmosphere.

The flue gas of certain fossil fuels (i.e. coal) includes solid particulate matter and a variety of gaseous contaminants. The maximum permissible emission levels of the particulate matter and gaseous contaminants are set by laws and regulations. The maximum emission levels are typically far less than the amounts present in the flue gas as it is produced, and various types of gas treatment apparatus are usually provided to reduce the particulate matter and gaseous contaminants in the flue gas before it leaves the stack.

In many power plants, particulate matter in the gas stream is removed by electrostatic precipitation. An electrostatic charge is applied to the particulate matter in the flue gas, and the flue gas passes between charged electrodes. The particulate matter is deposited upon the electrode having the opposite charge lo that of the particulate and is later removed.

In plants burning coal, the fuel typically contains from about 0.2 percent to about 6 percent sulfur, which at least in part oxidizes to sulfur dioxide during combustion. A small part of the sulfur dioxide further oxidizes to sulfur trioxide. Since the combustion air and the fuel also contain moisture, the flue gas contains water vapor. The sulfur trioxide and water vapor in the flue gas react to produce sulfuric acid, which deposits upon the particulate matter. The sulfuric acid deposited upon the particulate matter imparts a degree of electrical conductivity to the particulate and promotes the electrostatic precipitation process.

If the fossil fuel contains too little sulfur, so that there is a deficiency of sulfur trioxide, and thence sulfuric acid in the flue gas, or the fuel contains a high ash content, the electrostatic precipitator may not function properly because of the high electrical resistivity of the particulate. It is therefore known to add sulfur trioxide from an external source to the flue gas produced from burning low-sulfur fossil fuels. See, for example, U.S. Pat. No. 3,993,429.

In the '429 sulfur trioxide conditioning system, sulfur is burned to form sulfur dioxide, which is passed over a catalyst to achieve further oxidation to sulfur trioxide. The sulfur trioxide is injected into the flue gas flow upstream of the electrostatic precipitator. The amount of injected sulfur trioxide is controlled by varying the amount of sulfur that is burned. Other similar sulfur trioxide systems, which have been successfully used commercially, include a system which starts with a sulfur dioxide feedstock, which is vaporized and then catalytically convened to sulfur trioxide.

Sulfur trioxide injection systems, such as illustrated in the '429 patent, work well and are widely used. In some instances, however, there are drawbacks: high equipment capital costs; a constant supply of sulfur or sulfur dioxide feedstock is required, and this feedstock must be safely handled; the several components of the burning, catalyzing, and injecting system must be kept in good working order; there is a substantial power consumption associated with the process; when the plant or system goes into stand-by condition, the system, at least from the converter forward, must be purged to prevent excessive corrosion of the system and/or blockage of the probe nozzles; the rejection arrangement must be operative over a range of boiler operating conditions in a manner that appropriate mixing is achieved prior to the flue gas stream entering the precipitator; because the conversion of the newly produced $SO_2$ to $SO_3$ is not always 100% efficient, trace amounts of excess $SO_2$ may be produced; in many instances, significant runs of hot gas insulated duct-work must be included, together with complicated and costly manifold assemblies; and the like.

U.S. Pat. No. 5,011,516 describes an alternate approach to the types of systems illustrated in the '429 Patent, and teaches an arrangement wherein a slip stream of flue gas is drawn from the main flow and passed over a catalyst. A portion of the sulphur dioxide in the slip stream is oxidized to sulfur trioxide, and the slip stream is merged back into the main flue gas flow. While of interest, this approach has major drawbacks when implemented, for example: system thermal efficiency is reduced because less heat is recovered; there is typically insufficient mixing of the slip stream with the main flow at the point where they rejoin, due to an insufficient pressure differential; and the like. Moreover, the '516 patent does not disclose any approach which permits control of the amount of sulfur trioxide produced, responsive to variations in the sulfur content of the fuel and changes in other operating parameters. A patent to a related approach, U.S. Pat. No. 3,581,463, suggests using a fan to draw a portion of the hot gas flow into the slip stream, but gives no further details as to how the amount of sulfur trioxide can be controlled. One can imagine that valving could be added to the slip stream to control its total flow, but such valves are complex, expensive, and difficult to build.

U.S. Pat. No. 5,320,052, which is assigned to the same assignee as is this invention, provides an improvement over the approaches discussed above and includes a catalytic converter support adapted to be disposed across at least a portion of the cross-section of the main duct, and a catalyst for the oxidation of sulfur dioxide to sulfur trioxide is supported by the catalyst support. This system further includes a mechanical adjustment means for selectively adjusting the amount of surface area of the catalyst which is exposed to the flow of flue gas in the main duct. While it is believed that the '052 system is an advance over the prior art discussed hereinabove, several problems and/or deficiencies may exist, for example: structural modifications to the duct, which are required in a retrofit and/or new installed FGC system of this sort, is expensive and may be difficult to achieve in many instances; mechanical complexity, with a resultant potential for breakdown; the area required of the catalyst, and the supporting structure at the face is relatively substantial and this may result in a significant back pressure being created, which in turn may result in a decrease in power plant efficiency; depending upon the various adjustments of conversion required, the catalyst will have a tendency to uneven wear; and the like.

In addition to the above approaches, a currently pending patent application, which is assigned to the same assignee as is this invention, provides a somewhat different approach. This application includes catalyst positioned within the main flue gas duct, and incorporates heating and/or cooling means for selectively varying the surface temperature of the catalyst, to take advantage of the phenomena that, within a predetermined temperature range, conversion efficiency of the catalyst will vary. While this arrangement has certain advantages of the mechanical systems discussed (i.e. less mechanical complexity, simpler retrofit, no moving parts, potential of decreased pressure loss, and the like), certain disadvantages are readily apparent (i.e. energy cost, capital expense, the cost of the surface temperature heating and cooling means, the replacement of components of a temperature responsive in-due catalyst assembly may be more costly than replacing wear components of a mechanical system, and others).

There exists a still further currently pending patent application (U.S. application Ser. No. 08/349,566), which is assigned to the same assignee as the present invention and provides a still additional approach. This application includes transversely spaced catalyst portions disposed across sections of the main duct, as well as flow resistance sections disposed intermediate the catalyst portions in a manner that the pressure loss coefficient as to the flue gas passing through the sections is within a preselected range. An adjustment assembly is additionally included which is selectively operative to vary the quantity of flue gas flow passing through the catalyst portions. Prior to the instant invention, it was believed that this latter system was the most suitable type of "in-duct" system in many instances (i.e. decreases mechanical complexity, reduces energy cost, less capital cost, simpler retrofit, easier maintenance, and the like); however, certain deficiencies of such a system are apparent (i.e. although reduced, capital cost is still relatively high, abrasion due to the flyash present in the flue gas is not as controlled as would be preferred, energy losses due to the fact that the main flow is substantially obstructed by the deflectors, catalyst and flow resistance sections, inability to readily adjust the catalyst positioning across the cross section of the duct—to compensate for nonuniform flue gas flow across such cross section, and the like)

There is therefore a need for an improved approach to sulfur trioxide conditioning of flue gas streams. The present invention fulfills this need, and further provides related advantages.

SUMMARY OF THE INVENTION

The present invention provides an apparatus and method for sulfur trioxide conditioning of flue gas streams produced by fossil fuel power plants. This approach permits a selectively controllable amount of sulfur trioxide to be created in the flue gas stream. The apparatus used to accomplish the sulfur trioxide generation is simple and rugged, and readily controlled to precisely vary the sulfur trioxide addition. There is no sulfur burning apparatus or supply of sulfur or sulfur dioxide required. No slip stream is taken from the flue gas stream, and no associated variable-speed fan or valving is used to achieve controllability. No additional sulfur dioxide is added to the flue gas stream with the sulfur trioxide addition. There is no difficulty in mixing the sulfur trioxide into the flue gas stream. No overly cumbersome or difficult to maintain equipment is required. Backpressure caused by the system of the present invention, is significantly reduced from some prior systems heretofore. Only a relatively minor modification to the duct work is required for the present invention. Capital and running costs may be relatively lower. The invention provides means for readily compensating for the fact that flue gas flow is not necessarily uniform over the cross-section of the flow path. Wear of the catalyst due to abrasion is substantially alleviated.

In accordance with the invention, a sulfur trioxide conditioning system is provided for use in a fossil fuel-burning facility having a main duct for transporting sulfur dioxide-containing flue gas from a boiler, through a heat recovery apparatus, and to particulate removal equipment, such as an electrostatic precipitator, for subsequent discharge through a stack. The sulfur trioxide conditioning system includes modules incorporating catalytic sections for converting a portion of the sulfur dioxide in the flue gas to sulfur trioxide. The modules include selectively operable aspirating means for creating an aspirating force to vary the quantity of flue gas drawn through the converter sections. The modules additionally include a deflector and/or filter section adjacent the inlet end thereof for ash reduction, to alleviate the deleterious wearing effects of the flyash directly impinging on the catalyst section, which result in the premature replacement thereof, as well as to alleviate blockage of the catalyst which can result from accumulated flyash.

The present invention provides an advance in the art of flue gas conditioning. Other features and advantages of the present invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

Figure 1:
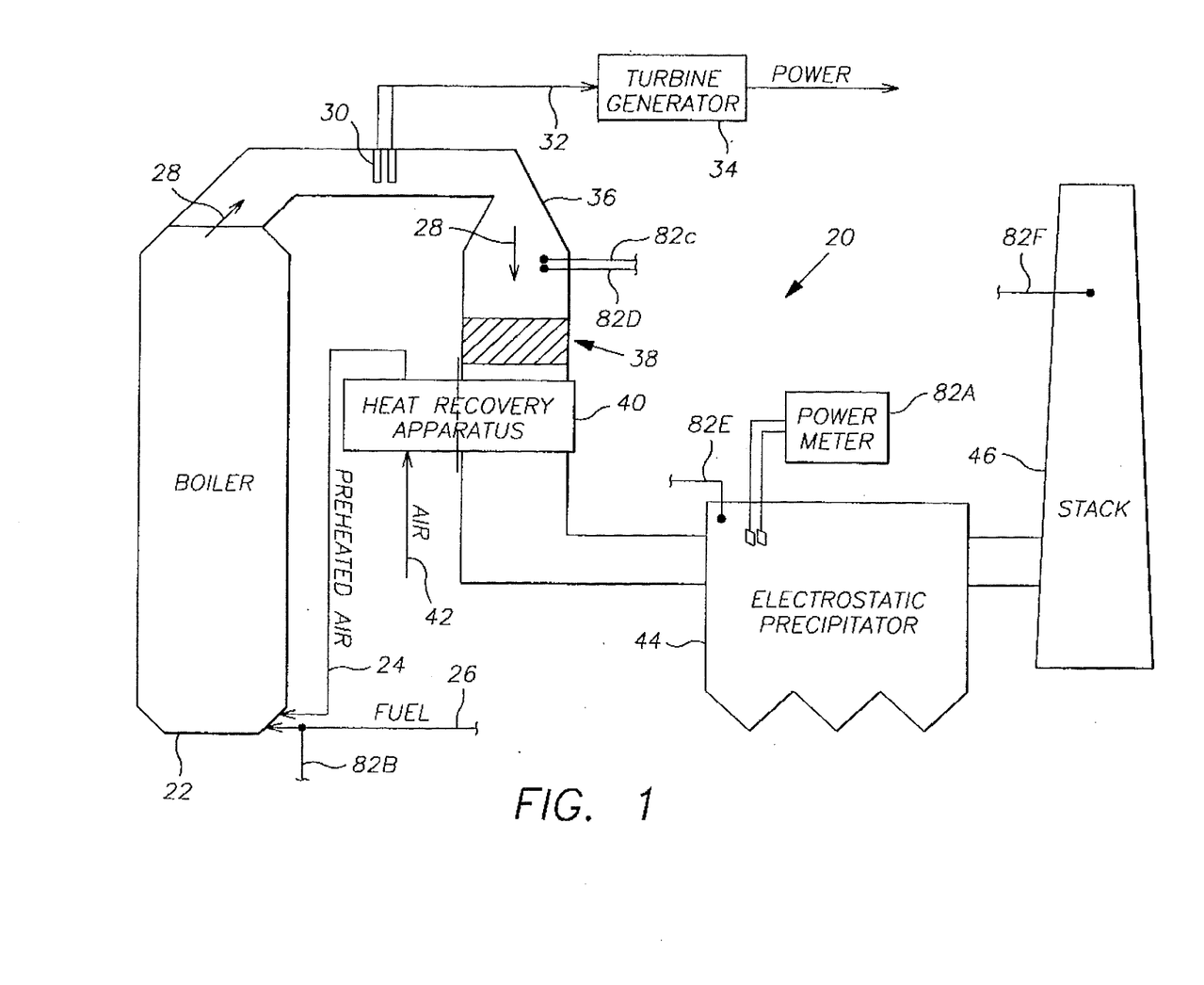
FIG. 1 is a schematic depiction of a fossil fuel power plant incorporating the principles of the present invention.

FIG. 1 schematically illustrates a fossil fuel power plant 20 utilizing the apparatus and method of the present invention therewithin. Briefly, the power plant 20 has a combustor/burner 22, which is supplied preheated air through conduit 24, and fuel through fuel inlet 26. The fuel is combusted with the air, producing a flue gas flow 28. The flue gas flow 28 contains particulate matter (sometimes referred to as flyash), as well as other combustion products. The flue gas flow 28 heats water flowing in boiler tubes 30 and converts it to steam 32. The steam 32 is supplied to a turbine/generator 34 which produces electrical power.

Flue gas flows through the primary flue gas duct 36 and thence through a sulfur trioxide conditioning system of the present invention, generally indicated at 38. The flue gas flow 28 then passes through a heat recovery apparatus 40, wherein heat is transferred from the flue gas flow 28 to an incoming air flow 42 to provide preheated air flow through conduit 24. After leaving the heat recovery apparatus 40, the gas flow 28 enters an electrostatic precipitator 44, in which a large fraction of the particulate matter is removed by the application of electrostatic fields to the flue gas. The flue gas flows, with most particulate removed, through an exhaust stack 46.

This discussion of the power plant 20 is intended to be highly schematic in nature and to provide the information necessary to understand, practice, and enable the present invention. In an operating power plant there are typically many other systems, as well as alternative systems, that are not shown here. The present invention is compatible with such other systems and may be used with them.

The flue gas entering the electrostatic precipitator 44 must have enough sulfur trioxide to react with water vapor in the flue gas to produce a sufficient amount of sulfuric acid, which is deposited upon the surfaces of the particulate, prior to entering the electrostatic precipitator 44. The sulfuric acid imparts electrical conductivity to the particulate in the flue gas, to better insure that such conductivity is at a sufficient level for the proper and efficient use of electrostatic precipitators 44. Sufficient sulfur trioxide must be present to form the necessary sulfuric acid.

In the present invention, sulfur trioxide is produced in the sulfur trioxide conditioning system 38 of the present invention, by the catalytic oxidation of a portion of the sulfur dioxide in the flue gas flow 28 to sulfur trioxide. Depending upon the catalyst used, the catalytic oxidation may be accomplished at a temperature above 400° F., and within a range of 400° F. to 1000° F., preferably 600° F. to 900° F. From present considerations, it is believed a minimum temperature of the flue gas flow 28, as it passes by the catalyst in system 38, may be 450° F., and in certain situations, no less than 600° F. The most appropriate temperature range, coupled with considerations of power plant efficiency and design, dictates that the flue gas conditioning system 38 be positioned within duct 36, intermediate the discharge from burner 22, and the heat recovery apparatus 40, although other locations are envisioned, if operating, physical and other conditions permit.

Figure 4:
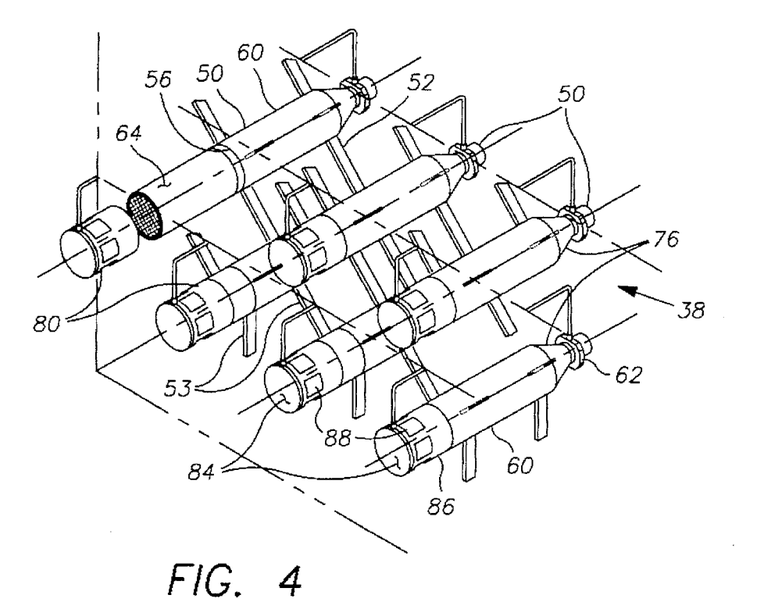
FIG. 4 is a schematic isometric view of an array of flue gas conditioning modules of the present invention positioned within a flue gas duct.
Figure 5:
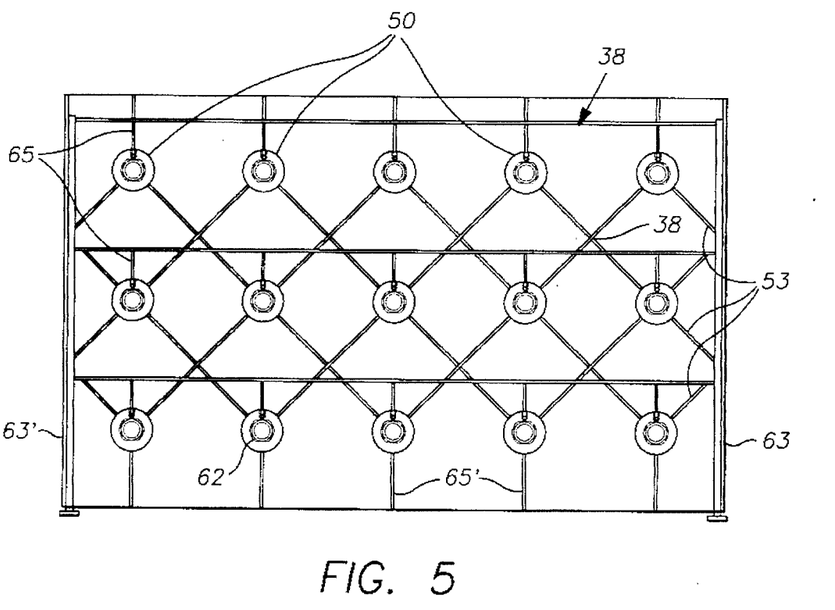
FIG. 5 is a schematic plan view, as viewed upwardly from the downstream ends, of an array of flue gas conditioning modules of the present invention positioned within a flue gas duct.

Referring now to FIGS. 4 & 5, the sulfur trioxide conditioning system 38 is illustrated as comprising a spaced array of flue gas conditioning modules 50, constructed in accordance with the principles of the present invention, which is supported within the duct 36 by a suitable support matrix 52 (hereinafter described in detail). The support matrix may be of any suitable construction which will rigidly support the modules 50 and, as illustrated, include a number of tubular members 53, which extend diagonally between the walls of the duct 36 and the outer periphery of the modules 50. The tubular members 53 may be fixed in position in any suitable manner, for example, by welding, or in releasable connection in conjunction with connectors affixed to tubular members 53 and the walls of duct 36. Obviously other structural supporting arrangements may be adopted.

Figure 2:
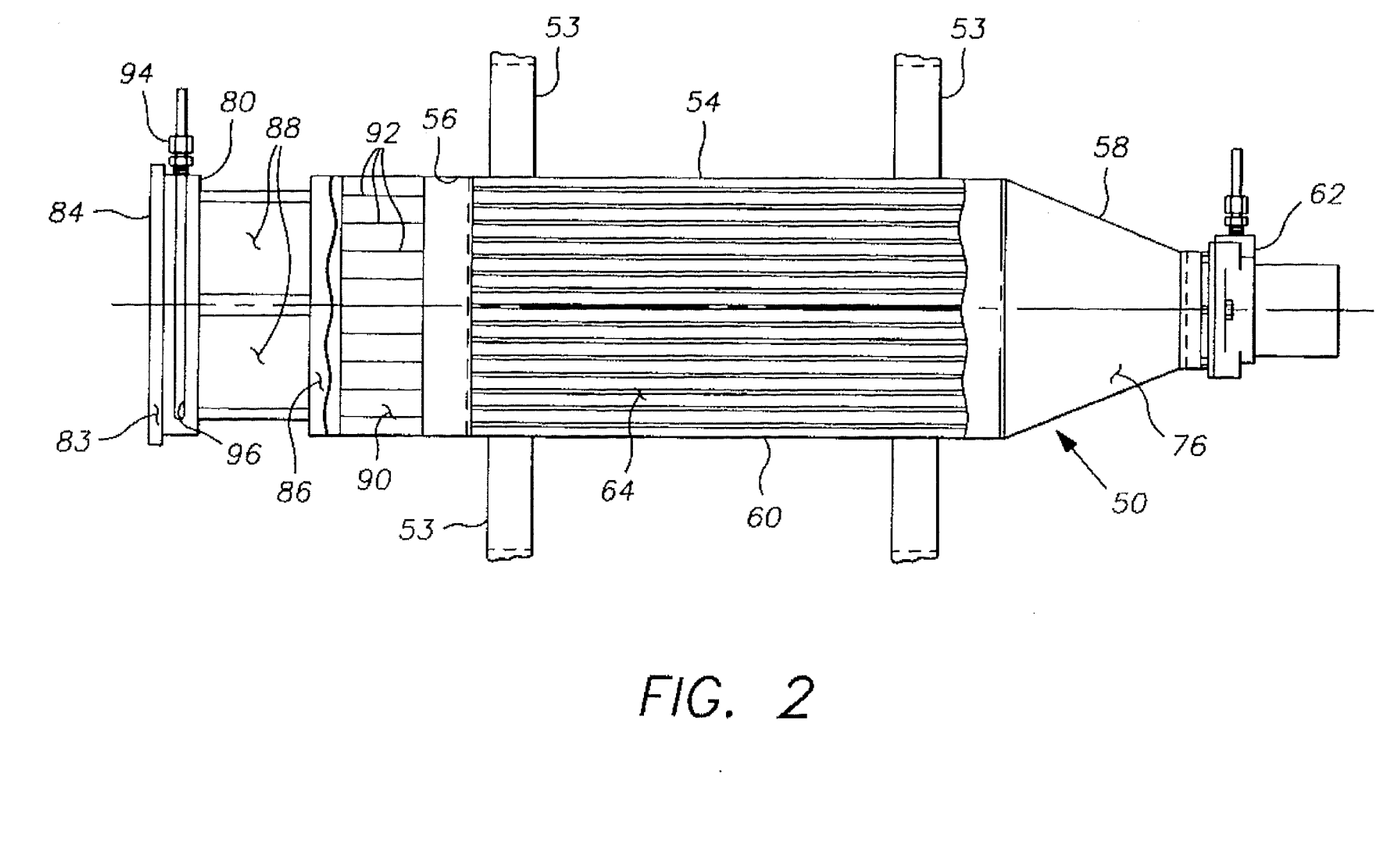
FIG. 2 is a side elevational view, partially in section, of one embodiment of a sulfur trioxide flue gas conditioning module, of the present invention.

As is best illustrated in FIG. 2, each flue gas conditioning module 50 comprises: a body assembly 54 having upstream and downstream axially spaced open ends thereof, 56 and 58, respectively; a converter section 60 located within body assembly 54, intermediate said axial ends; and selectively operable aspirating means 62.

Converter sections 60 support catalyzed portions 64 therewithin which are operative to promote a chemical reaction to convert a portion of the $SO_2$ in the flue gas stream passing therethrough to $SO_3$. Any suitable catalyst may be used for the oxidation of sulfur dioxide to sulfur trioxide, including base metal oxide or precious metal catalysts (i.e. vanadium oxide, platinum based and the like). The selection of the type of catalyst used is dependent on a number of factors (i.e.

catalyst cost vis a vis conversion requirements, temperature of the flue gas passing by the catalyst, total surface area of the catalyst, back pressure considerations, and the like). Any suitable configuration of catalyst may be used, for example a honey-comb configuration. Similarly, the catalyzed portions 64 may include any suitable substrate, such as solid metallic or ceramic substrates. The axial extending length of the catalyzed portions 64 is a matter of design choice, taking into consideration such parameters as temperature of the flue gas flow, type of catalyst used, velocity, back pressure limitations and the like. Applicant believes that a range of catalyst length of from 6 inches to 6 feet should suffice in most instances. Furthermore, in recognition that catalytic efficiency is dependent, in addition to other criteria, on the temperature of the catalyst or the flue gas flow. In this regard, the invention includes considerations of controlling such temperature by providing, if desired, an arrangement for adjusting the surface temperature of the reactive portion of the catalyzed portions 64, and/or providing a heating assembly upstream of the catalyzed portions to selectively heat the portion of the flue gas flow passing through the module 50. Inasmuch as the construction and application of such latter arrangements would be relatively apparent to one skilled in the relevant art, a detailed showing and discussion relating thereto is not deemed to be necessary.

Inasmuch as it is anticipated that the total upstream face area of the flue gas conditioning modules 50 is relatively small when compared to the total cross sectional area of the duct 36 and, further, the catalyzed portions will present resistance to the flow of flue gas therethrough, the flue gas stream will largely bypass the modules 50, unless means are provided to "draw" portions of the flue gas through the modules. It is for this purpose that the aspirating means 62 are provided. There are a number of known devices which are suitable for use to induce or cause aspiration of a portion of the flue gas flow through the modules 50 (i.e. ejectors, eductors, coandas, air amplifiers, vacuum transducers, and the like). The applicant favors a gas amplifier for aspirating means 62 and, in the embodiment shown, there is illustrated the aspirating means 62 of a type manufactured by ITW Vortec under the trademark TRANSVECTOR®, or by EXAIR Corporation under the trademark EXAIR.

Figure 3:
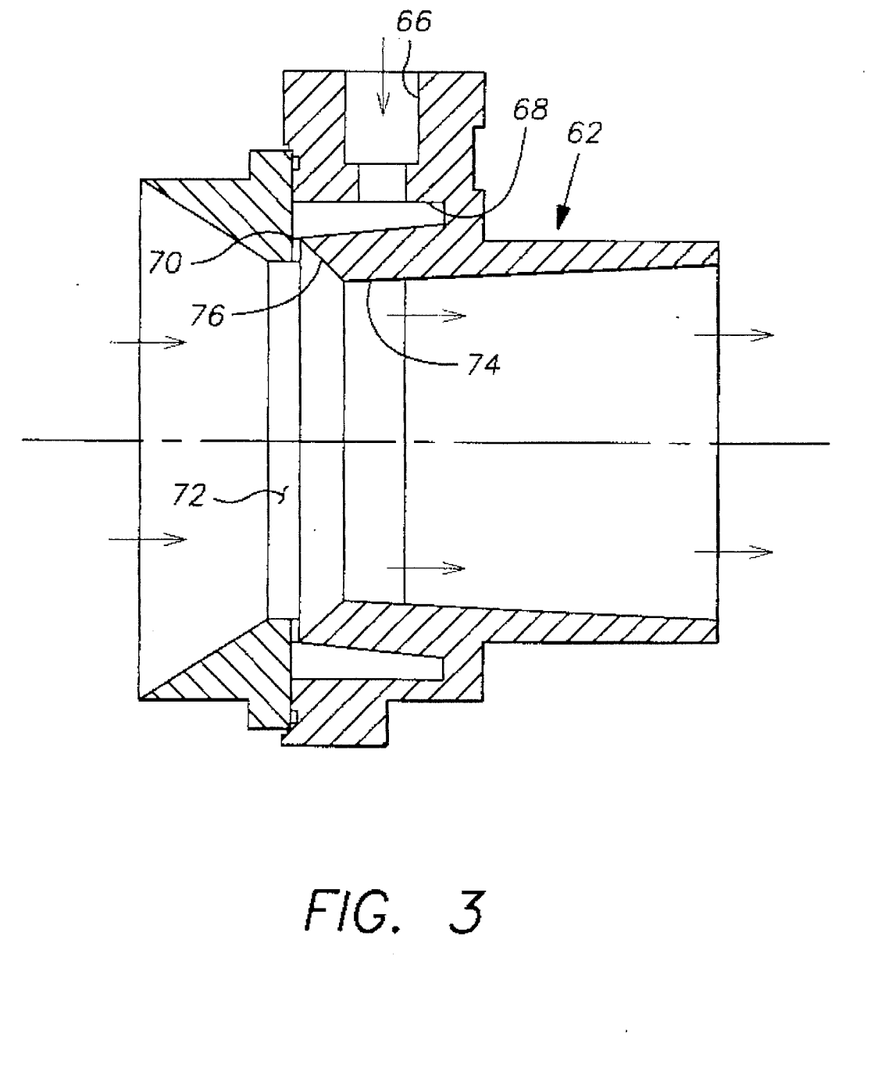
FIG. 3 is a schematic side elevational view of one type of aspirating means 2 which can be used in the flue gas conditioning module illustrated in FIG. 2.

The aspirating means 62 is known in the art and, as illustrated, is rendered operable by compressed air flowing from a suitable compressed air source (not shown), which communicates with the modules 50 via a balanced header duct 63 and conduits 65, through the radially extending inlet 66, into an annular chamber 68, from which it exits through an annular orifice 70 at a high velocity. For fabrication purposes, as well as for providing a proper profile for the flue gas stream entering the aspirating means 62, a frusto conical transition section 76, the downstream radius of which is smaller than the upstream radius thereof, extends axially intermediate the converter section 60 and the aspirating means 62. As the high velocity air passes through orifice 70, a lip 72 deflects the stream along a coanda profile 74 toward the downstream end. A low pressure area is created at the center of the upstream end of the aspirating means 62, to induce an aspirated flow of the flue gas through the module 50. By selectively adjusting the quantity of pressurized air provided to the aspirating means 62, the amount of flue gas flowing through the module 50 changes proportionally, by the resultant selective variance of the aspirating force established by the aspirating means 62. Furthermore, inasmuch as the amount of sulfur dioxide in the flue gas stream which is converted to sulfur trioxide, is also dependent, among other criteria (i.e. temperature, type of catalyst, surface area of the catalyst, and the like), on the quantity of flue gas passing through the modules, selectively varying the aspirating force, in turn can be considered as a means of selectively varying the quantity of generated sulfur trioxide. As is indicated above, other types of aspirating means 62 can be provided, and further, they can also be provided with differing sources of compressed driving media (i.e. steam rather than air).

A primary advantage of the present invention over much of the more directly related prior art provided heretofore, is the relatively low additional pressure drop to the flue gas stream which occurs when the conditioning system 38 is operatively positioned within the flue gas stream. In this regard, it is preferred that: the number of modules 50; the total frontal entry area thereof, when compared to the total cross sectional area of the flue gas path in which the conditioning system 50 is positioned; the flow resistance offered by the support matrix 52; and the like, be selected that such total pressure loss is no more than one inch water gage, preferably no more than one-half of an inch water gage. The selection criteria take into consideration the economic effect of the cost of supplying the compressed driving media and, in this regard, it is suggested that when such aspirating means 52 is a gas amplifier arrangement, that the air amplification ratio thereof be at least 30 to 1, or more broadly, within a range of 10 to 60 to 1.

The present invention also recognizes the fact that the catalyst of the catalyzed portions 64 is somewhat susceptible to destruction by erosion which may be caused by the impingement of the unobstructed and/or high velocity particulate or flyash of a flue gas stream, directly on the catalyst sections 60. In recognition of this problem, a first design criteria is to limit the velocity of the flue gas stream as it enters the converter section 60 to no more than 50 feet per second, preferably no more than 30 feet per second, regardless of the velocity of the main flue gas stream flow in the vicinity of the modules 50 (i.e. typically 30 to 60 feet per second). This limit or control is provided by the very nature of the aspirating means 62, and also by the flow throttling effect of an ash reducing section 80. The ash reducing section 80, serves two purposes, first to alleviate erosion by preventing direct full force impingement of the flyash in the flue gas stream on the catalyzed portions 64 and, secondly, by potentially significantly reducing the amount of flyash in the flue gas stream which passes through the converter section 60, the accumulation of flyash on the surfaces of the catalyzed portions 64, and the resultant deleterious effects (i.e. decreases in conversion efficiency because of catalyst masking, reduction in the amount of flue gas passing through the conditioning modules, decrease in the life expectancy of the catalyzed portions, and the like), may be significantly reduced.

To achieve the above results, the ash reducing section 80 may be of any suitable construction and, as shown, incorporates a shield portion 83 spaced upstream from said upstream axial end 56. The shield portion 83 incorporates an upstream domed face 84 which acts to deflect the ash in the flue gas stream from direct entry into the body assembly 54. A support portion 86 extends axially intermediate the body assembly 54 and the shield portion 83 for the support of shield portion 83 by the body assembly 54. As illustrated in FIG. 4, the support portion 86 is generally cylindrical in configuration and is dimensioned to "press fit" over the body member and be releasably retained in position by friction or clips (not shown). It is to be noted, and as best viewed in the upper left most module of FIG. 4 (which is partially exploded), that the easy removable reducing section 83 provides a simple and economical way of inserting and replacing catalyst portions 64 by merely sliding in and out of the converter section 50. Support portion includes perforations or formed openings 88 which extend transversely through the support portion 86, to permit the transverse entry of the flue gas stream into the body assembly 54. Inasmuch as the initial entry of the flue gas into the body assembly 54 is in the transverse direction, it is desired that some sort of flow straightening device be provided to insure a steady and uniform flow in the converter section 60 and, in this regard, a flow straightener section 90 is provided adjacent the downstream end of the support portion 86. The flow straightener section 90 may be of any suitable configuration and, as illustrated includes a plurality of parallel vanes 92 running transversely of the axial extent of the modules 50. The vanes 92 tend to "smooth" the flow of the portion of the flue gas stream flowing through the module 50 (i.e. the stream lines of the portion of the flue gas flow entering the catalyzed portions 64 will be substantially perpendicular to the upstream face area of the catalyzed portions 64). Other configurations may be readily substituted for vanes 92, for example, a honey-combed configuration, an array of radially extending axial vanes and the like.

Depending upon such parameters as velocity, temperature, the type of coal being burned, as well as its moisture content, the burner configuration and operation and the like, a certain amount of particulate, such as flyash, will accumulate on the catalyst portion 60, as well as other interior sections of the modules 50. This flyash accumulation must be controlled or it may otherwise result in significant reduction in conversion efficiency or capacity of the conditioning system 38, additional backpressure, lessening of the effective life of the catalyst portions 60, and the like. Applicant has anticipated the need for such a particulate control system and, in this regard, incorporates a cleaning assembly 94 with flue gas modules 50. Cleaning assembly 94 may be of any suitable type, for example, there is partially illustrated in the drawings, a soot blowing type of cleaning assembly which includes an inlet 96 through which a compressed driving media (i.e. pressurized air or superheated steam) is selectively directed. When operable, the compressed media passes from a suitable source (not shown) through a header duct 63' and through conduits 65', which communicate with the inlet 96, to a suitable nozzle arrangement (not shown) and is directed downstream to dislodge accumulated flyash from the interior of the module 50. If desired, other types of arrangements may be substituted for the illustrated soot blowing type cleaning assembly 94, for example an acoustic horn.

In recognition of the problems discussed hereinabove relating to the flyash, the conception herein additionally includes utilizing any number of filter arrangements (not shown) to filter at least a major portion of the flyash from the portion of the flue gas flow entering the catalyzed portions 62, for example fabric filters can be positioned to cover the perforations or formed openings 88 to filter the flyash from the portion of the flue gas passing therethrough. Furthermore, the nozzle arrangement for cleansing assembly can be further oriented to also direct the pressurized media toward the fabric filter to dislodge any accumulated flyash therefrom.

The present invention is particularly suitable for direct automatic adjustment and control of the aspirating means 62. In this regard a number of signals can feed back to a suitable microprocessor controller (not shown) to selectively control the pressure of the pressurized driving media provided to the aspirating means 62, in response to boiler operational parameters or boiler load signals. Examples of such signals can include, by way of example, but not limitation: sensor 82a, the power consumed by the electrostatic precipitator 44 (a measure of the amount of particulate being collected); sensor 82b, the fuel load; sensor 82c, the chemical composition of the flue gas, including the sulphur dioxide and sulphur trioxide contents; sensor 82d, the exhaust gas temperature; sensor 82e, the electrical properties of the fly ash particulate, such as its resistivity; and/or sensor 82f, the stack gas opacity. The construction of each of these sensors are individually well known in the art.

Although a particular embodiment of the invention has been described in detail for purposes of illustration, various modifications may be made without departing from the spirit and scope of the invention; for example, one or more doors can be positioned in the system support 50 to assist in the removal and insertion of the catalyst; the configuration of shield assemblies can be modified to suit conditions; other forms of driving arrangements may be used for moving the shield assemblies 70; and the like. Accordingly, the invention is not to be limited except as by the appended claims.

In considering this application, it is to be understood and appreciated that any number of changes can be made, by one skilled in the relevant art, to the preferred embodiments discussed hereinabove, and the invention herein is only defined by the scope of the claims setforth hereinafter. Examples of such changes include, but are not limited to: utilizing a plurality of aspirator means 62 for modules 50, either in series (for pressure drop considerations), or in parallel (to increase flow); the catalyzed portions 64 may be intermittent (i.e. a number of axially spaced portions 64, rather than a single continuous portion 64); and the like.

We claim:

1. A flue gas conditioning module for use in a fossil fuel-burning facility for increasing the electrical conductivity of fly ash in a flue gas stream by catalytically converting a portion of the sulfur dioxide in the flue gas stream to sulfur trioxide, comprising:

a body assembly having upstream and downstream axially spaced open ends thereof;

a converter section located within said body assembly, intermediate said axial ends, with said converter section containing catalyst means which, when the module is positioned within the flue gas stream, and within a predetermined temperature range, converts at least a portion of the sulfur dioxide in the flue gas passing therethrough to sulfur trioxide; and selectively operable aspirating means, in communication with said body assembly, to create an aspirating force for varying the quantity of flue gas drawn through said converter section.

2. A flue gas conditioning module as specified in claim 1 wherein the lower end of said predetermined temperature range is no less than four hundred and fifty (450)° F.

3. A flue gas conditioning module as specified in claim 2 wherein the upper end of said predetermined temperature range is no greater than one thousand (1000)° F.

4. A flue gas conditioning module as specified in claim 1 wherein said predetermined temperature range is six hundred (600)° F. to nine hundred (900)° F.

5. A flue gas conditioning module as specified in claim 1 wherein said catalyst is a precious metal catalyst means.

6. A flue gas conditioning module as specified in claim 1 wherein said catalyst is a base metal oxide catalyst means.

7. A flue gas conditioning module as specified in claim 1 wherein said aspirating means is positioned adjacent said downstream axial end.

8. A flue gas conditioning module as specified in claim 7 wherein said aspirating means is a gas amplifier which is connectable to a compressed driving media.

9. A flue gas conditioning module as specified in claim 8 wherein said compressed driving media is compressed air.

10. A flue gas conditioning module as specified in claim 8 wherein said compressed driving media is superheated steam.

11. A flue gas conditioning module as specified in claim 8, wherein said gas amplifier has an amplification ratio of at least 30 to 1.

12. A flue gas conditioning module as specified in claim 8, wherein said gas amplifier has an amplification ratio is in the range of 10 to 1 to 60 to 1.

13. A flue gas conditioning module as specified in claim 1 additionally including an ash reducing section positioned adjacent said upstream axial end, to reduce the amount of fly ash, contained in the flue gas stream, which passes through said module.

14. A flue gas conditioning module as specified in claim 13 wherein said ash reducing section includes, at least in part, a fabric filter assembly.

15. A flue gas conditioning module as specified in claim 14 wherein said reducing section additionally includes an erosion shield which deflects the ash in the flue gas stream from direct frontal flow through said upstream end.

16. A flue gas conditioning module as specified in claim 13 wherein said reducing section includes an erosion shield which deflects the ash in the flue gas stream from direct frontal flow through said upstream end.

17. A flue gas conditioning module as specified in claim 13 additionally including a flow smoothing section positioned axially intermediate said reducing section and said converter section to smooth out the flow of the flue gas stream passing through said converter section.

18. A flue gas conditioning module as specified in claim 17 wherein said flow smoothing section is operative in a manner that the stream lines of the portion of the flue gas flow entering said converter section are substantially perpendicular to the upstream face area of said converter section.

19. A flue gas conditioning module as specified in claim 18 additionally including a selectively adjustable heater section positioned axially intermediate said reducing section and said converter section, to vary the temperature of the flue gas passing therethrough.

20. A flue gas conditioning module as specified in claim 13 additionally including a selectively adjustable heater section positioned axially intermediate said reducing section and said converter section, to selectively vary the temperature of the flue gas passing therethrough.

21. A flue gas conditioning module as specified in claim 13 additionally including a selectively adjustable heater means in communication with said catalyst means, to vary the surface temperature of said catalyst means.

22. A flue gas conditioning module as specified in claim 1 including a cleaning assembly positioned adjacent said upstream axial end and selectively operative, to assist in dislodging accumulated particulate from said converter section.

23. A flue gas conditioning module as specified in claim 22 wherein said cleaning device is an acoustic cleaner.

24. A flue gas conditioning module as specified in claim 1 including a soot blowing assembly positioned adjacent said upstream axial end and selectively operative, when provided with a compressed media source, to discharge compressed media in said direction of said downstream end, to assist in dislodging accumulated particulate from the converter section.

25. A flue gas conditioning module as specified in claim 24 wherein said compressed media is compressed air.

26. A flue gas conditioning module as specified in claim 24 wherein said compressed media is superheated steam.

27. A flue gas conditioning module as specified in claim 1 wherein the maximum percentage of sulfur dioxide in the flue gas passing through said module, which is converted to sulfur trioxide, is at least 80%, in response to the operation of said aspirating means.

28. A flue gas conditioning module as specified in claim 1 wherein the maximum percentage of sulfur dioxide in the flue gas passing through said module, which is converted to sulfur trioxide, is at least 30%, in response to the operation of said aspirating means.

29. A flue gas conditioning system positionable within the main flue gas duct of a fossil fuel burning facility, intermediate the burner and the air preheater, comprising:
   a spaced array of flue gas conditioning modules, each of which comprise:
      a body assembly having upstream and downstream axially spaced open ends thereof:
      a converter section located within said body assembly, intermediate said axial ends, with said converter section containing catalyst means which, when said system is positioned within the gas duct and is within a predetermined temperature range, at least a portion of the sulfur dioxide in the flue gas passing therethrough is converted to sulfur trioxide; and
   aspirating means selectively operable to create an aspirating force for varying the quantity of flue gas drawn through said converter section.

30. A flue gas conditioning system as specified in claim 29 wherein the maximum percentage of sulfur dioxide in the flue gas stream passing by said system, which is converted to sulfur trioxide, is at least 10%, in response to the operation of said aspirating means.

31. A flue gas conditioning system as specified in claim 29 wherein the maximum percentage of sulfur dioxide in the flue gas passing by the system, which is converted to sulfur trioxide, is at least 1%, in response to the operation of said aspirating means.

32. A flue gas conditioning system as specified in claim 29 which results in an additional pressure drop, insofar as the flue gas stream passing thereby, of less than 1 inch water gage.

33. A flue gas conditioning system as specified in claim 29 which results in an additional pressure drop, insofar as the flue gas stream passing thereby, of less than 0.5 inches water gage.

34. A flue gas conditioning system as specified in claim 29 wherein said aspirating means is a gas amplifier which is connectable to a compressed driving media.

35. A flue gas conditioning system as specified in claim 34 wherein said aspirating means are additionally operative to establish an upper limit on the velocity of the flue gas stream passing through said converter sections of said flue gas conditioning modules, regardless of the velocity of the flue gas stream upstream of said modules.

36. A flue gas conditioning system as specified in claim 35 wherein the upper limit is 50 feet per second.

37. A flue gas conditioning system as specified in claim 35 wherein the upper limit is 30 feet per second.

* * * * *